United States Patent [19]

Manabe et al.

[11] Patent Number: 5,523,813
[45] Date of Patent: Jun. 4, 1996

[54] SWITCHING MECHANISM FOR A PHOTOGRAPHIC CAMERA HAVING A PANORAMIC PHOTOGRAPHING FUNCTION

[75] Inventors: Mitsuo Manabe; Hiroshi Nakamura; Kazuhiko Onda, all of Ohmiya, Japan

[73] Assignee: Fuji Photo Optical Co., Ltd., Japan

[21] Appl. No.: 365,601

[22] Filed: Dec. 27, 1994

[30]   Foreign Application Priority Data

Dec. 28, 1993 [JP] Japan .................................. 5-351719

[51] Int. Cl.⁶ .......................... G03B 17/02; G03B 37/00
[52] U.S. Cl. ............................................ 354/94; 354/159
[58] Field of Search ............................. 354/94, 105, 106, 354/159

[56]              References Cited

U.S. PATENT DOCUMENTS

| | | |
|---|---|---|
| 5,083,146 | 1/1992 | Ueda . |
| 5,086,311 | 2/1992 | Naka et al. . |
| 5,255,030 | 10/1993 | Mukai et al. . |
| 5,353,077 | 10/1994 | Tanaka et al. . |
| 5,367,351 | 11/1994 | Suzuka et al. ........................... 354/159 |
| 5,389,988 | 2/1995 | Daitoku ................................... 354/106 |
| 5,410,381 | 4/1995 | Kameyama et al. ..................... 354/159 |

*Primary Examiner*—A. A. Mathews
*Attorney, Agent, or Firm*—Price, Heneveld, Cooper, DeWitt & Litton

[57]              ABSTRACT

The present invention discloses a switching mechanism for a photographic camera having a panoramic photographing function, wherein changeover between ON/OFF of a main switch as well as changeover of photographing mode (PANORAMA, NORMAL, etc.) can be simultaneously performed by a single manipulator and thereby not only the number of parts required for desired switching operation but also the space demand for these parts can be effectively reduced. More specifically, there is provided a changeover knob being slidably movable over a range which is associated at one end with OFF of the main switch, at a middle with ON of the main switch as well as one of NORMAL and PANORAMA MODES, and at the other end with the other MODE so that the camera is made ready for photographing in one of NORMAL and PANORAMA MODES as the changeover knob is slidably moved to its ON position and the camera is ready for photographing in the other MODE as the changeover knob is further slidably moved to the other end of its slidable movement range.

25 Claims, 4 Drawing Sheets

SWITCHING MECHANISM FOR A PHOTOGRAPHIC CAMERA HAVING A PANORAMIC PHOTOGRAPHING FUNCTION

BACKGROUND OF THE INVENTION

1. Field of the Invention

The present invention relates to a switching mechanism for a photographing camera which serves to perform changeover between ON/OFF of a main switch as well as changeover between NORMAL and PANORAMA MODES so that the camera may be selectively operated in NORMAL MODE, in order to provide a full-sized picture, or in PANORAMA MODE, in order to provide a picture having a size corresponding to a full-sized film frame with its upper and lower zones unexposed.

2. Description of the Related Art

An individual frame of 35 mm film will have a size of approximately 24 mm×36 mm when each frame of such film is used in its full size. Recently, a photographic camera having a panoramic photographing function has come into wide use, in which a picture of laterally long size corresponding to the full size but having its upper and lower zones unexposed. Such panoramic frame will have a size, for example, of approximately 16 mm×36 mm. Such camera will provide a picture particularly useful to record objects such as scenery and a site of construction work when these objects are photographed in PANORAMA MODE using a wide-angle objective.

The conventional photographic camera having a panoramic photographing function is typically provided with the main switch exclusively serving to make the camera ready for taking a picture and the mode changeover switch exclusively serving for changeover between NORMAL and PANORAMA MODES. For example, the objective which has been in its retracted position is put forth to its position ready for photographing as the main switch is changed over from OFF to ON. Then the mode changeover switch provided separately of the main switch may be operated to perform changeover between NORMAL and PANORAMA MODES.

However, a camera having a panoramic photographing function, of the type known in the prior art as mentioned above, requires relatively many parts. For example, in addition to switch buttons or switch knobs operatively associated with the separate switches, various members are provided interlocking these buttons or knobs with the respective switches, since these switch buttons or switch knobs are operatively associated with the separately provided main switch and the mode changeover switch. Consequently, the space for these buttons or knobs and the space for the various interlocking members must be available for the main switch and the mode changeover switch, respectively.

Moreover, with such conventional camera having a panoramic function, the camera can be made unready for photographing by changing over the main switch from ON to OFF independently of whether the photographing mode is in the NORMAL MODE or PANORAMA MODE. Accordingly, even after the main switch has been turned ON for the next photographing, the intended photographing mode can be reliably achieved only if it is first determined whether the photographing mode has been set to NORMAL or PANORAMA MODE. Specifically, in order to make the camera ready for photographing, the main switch is turned ON. Then it must be determined whether the photographing mode has been set to NORMAL or PANORAMA. If the camera is not in the desired mode, the mode changeover switch must be operated to change over this mode to the desired mode. In this way, inconveniently complicated operation is forced on the user.

SUMMARY OF THE INVENTION

In order to overcome the problem mentioned above, it is a principal object of the invention to provide an improved switching mechanism for a photographic camera having a panoramic photographing function which allows the number of parts required for the desired switching operation to be reduced. Additionally, the space which otherwise would be required for switch buttons or switch knobs and various members interlocking these buttons or knobs with respective switches to be effectively reduced by a unique arrangement that allows a predetermined photographing mode to be automatically set as the main switch is turned ON.

The object set forth above is achieved in a switching mechanism for a photographic camera having a panoramic photographing function with its photographing mode selectively switched between a NORMAL MODE which provides a normal-sized picture and a PANORAMA MODE which provides a picture of laterally long size corresponding to a picture of normal size having its upper and lower zones cut off. According to the invention, an ON/OFF changeover function for a main switch serving to change over the camera between its operative and non-operative states, as well as a mode changeover function for selecting between said NORMAL and PANORAMA MODES, are simultaneously performed by movement of a single manipulator means and the photographing mode is automatically set to any one of NORMAL and PANORAMA MODES as the main switch is turned ON.

Principally, the panoramic photographing function is generally classified in two types depending on the mechanism used to carry out the function. The first type relies upon pivotally movable dousers provided in front of an aperture. The second type is adapted to put a mark on a part of an individual film frame during exposure, which indicates that this frame of film has been exposed in a PANORAMA MODE. In the first type, the dousers are pivotally moved to cover upper and lower zones of the aperture and correspondingly to leave upper and lower zones of a normal-sized film frame unexposed in the PANORAMA MODE. The dousers are pivotally moved away from the upper and lower zones of the aperture so as to expose the full-sized film frame in the NORMAL MODE. In the second type, the mark put on the frame of the film is detected in a process of printing this film frame and only a vertically middle zone is printed on sensitized paper exclusively used for panoramic pictures.

According to a more detailed aspect of the invention, a single manipulator means may be arranged, for example, so as to be moved along a circular arc or a straight line, or to be rotated in a dial fashion, or may be realized in the form of a button adapted to be moved sequentially in a circle among the following positions: OFF of the main switch; NORMAL MODE; PANORAMA MODE; and OFF of the main switch. The switching mechanism may be arranged so that the photographing mode is either automatically set to NORMAL MODE or automatically set to PANORAMA MODE as the main switch is turned ON.

With the camera principally used for photographing in a NORMAL MODE, but also provided with a panoramic photographing function, the switching mechanism may be arranged so that changeover from NORMAL MODE to PANORAMA MODE can be achieved only after a lock means has been released. In this manner, it is assured that the photographing mode will be set to the PANORAMA MODE only if intended by the user.

The switching mechanism may also be arranged so that the dousers can be pivotally moved from their positions for PANORAMA MODE to their NORMAL MODE positions utilizing an arrangement such that the lock means must be released to achieve changeover from NORMAL MODE to PANORAMA MODE but no release of the lock means is required for changeover from PANORAMA MODE to NORMAL MODE. Such arrangement protects the dousers and the driving components therefor from being damaged or deformed when the camera is dropped or otherwise subjected to shock.

In the embodiment in which the manipulator means is slidably movable over a range which is associated at one end with the OFF position of the main switch, at the other end with the PANORAMA MODE, and at a middle with NORMAL MODE, the main switch is turned ON and simultaneously the photographing mode is set to NORMAL MODE, making the camera ready for photographing in the NORMAL MODE as said manipulator means is slidably moved from the non-operative state of the camera. The photographing mode is changed over to the PANORAMA MODE as the manipulator means is further slidably moved. It should be noted here that, if the switching mechanism includes the lock means, the changeover to the PANORAMA MODE is possible only after said lock means has been released. The main switch is turned OFF and the camera is made non-operative as said manipulator means is slidably moved from the position of NORMAL MODE to the OFF position of the main switch.

DETAILED DESCRIPTION OF THE PREFERRED EMBODIMENT

The switching mechanism according to the invention in a photographic camera having a panoramic photographing function will be more fully understood from the following detailed description of the preferred embodiments, referring to the accompanying drawing.

Figure 1:
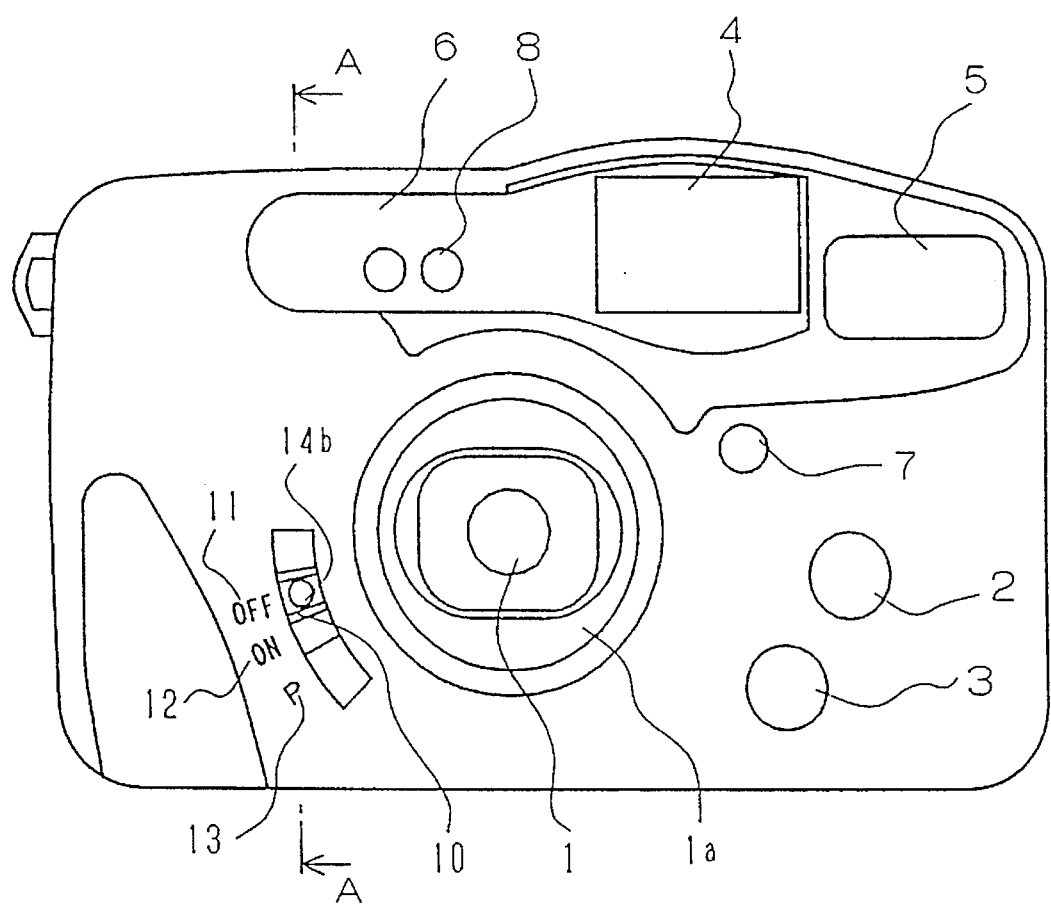
FIG. 1 is a front view of a photographic camera incorporating a switching mechanism for a panoramic photographing function according to the invention.

FIG. 1 is a front view of the photographic camera provided with the switching mechanism and, as shown, the camera has adjacent to its center an objective 1 held by a lens barrel 1a. Off to the lower left of the objective 1, as viewed in FIG. 1, there is provided a changeover knob 10 so as to be slidably movable around an optical axis of the objective 1 along a circular arc.

An end of the range over which the changeover knob 10 is slidably movable corresponds to an OFF index 11 of a main switch, a middle zone of the range corresponds to an index 12 indicating turn-ON of the main switch as well as a normal photographing mode, and the other end of the range corresponds to a panoramic photographing mode index 13.

The camera further includes zooming means adapted to move objective 1 back and forth along the optical axis thereof and thereby to change its focal distance, and a telephoto switch 2 as well as a wide-angle switch 3 on the right side of said objective 1, both being used for zooming drive. Above the objective 1, the camera has a view-finder window 4 and a strobe-flash window 5 arranged side-by-side. On the side of view-finder window 4 remote from said strobe-flash window 5, the camera has a range-finder window 6 behind which there is provided a range-finding element (not shown) for automatic focussing. There is further provided on the right side of the objective 1 and above the array including said tele-photo switch 2 a display lamp 7 for timer-based photographing. Range-finder window 6 is centrally provided with a lamp 8 to alleviate a red-eye phenomenon associated with strobe-flashed photographing.

Figure 2:
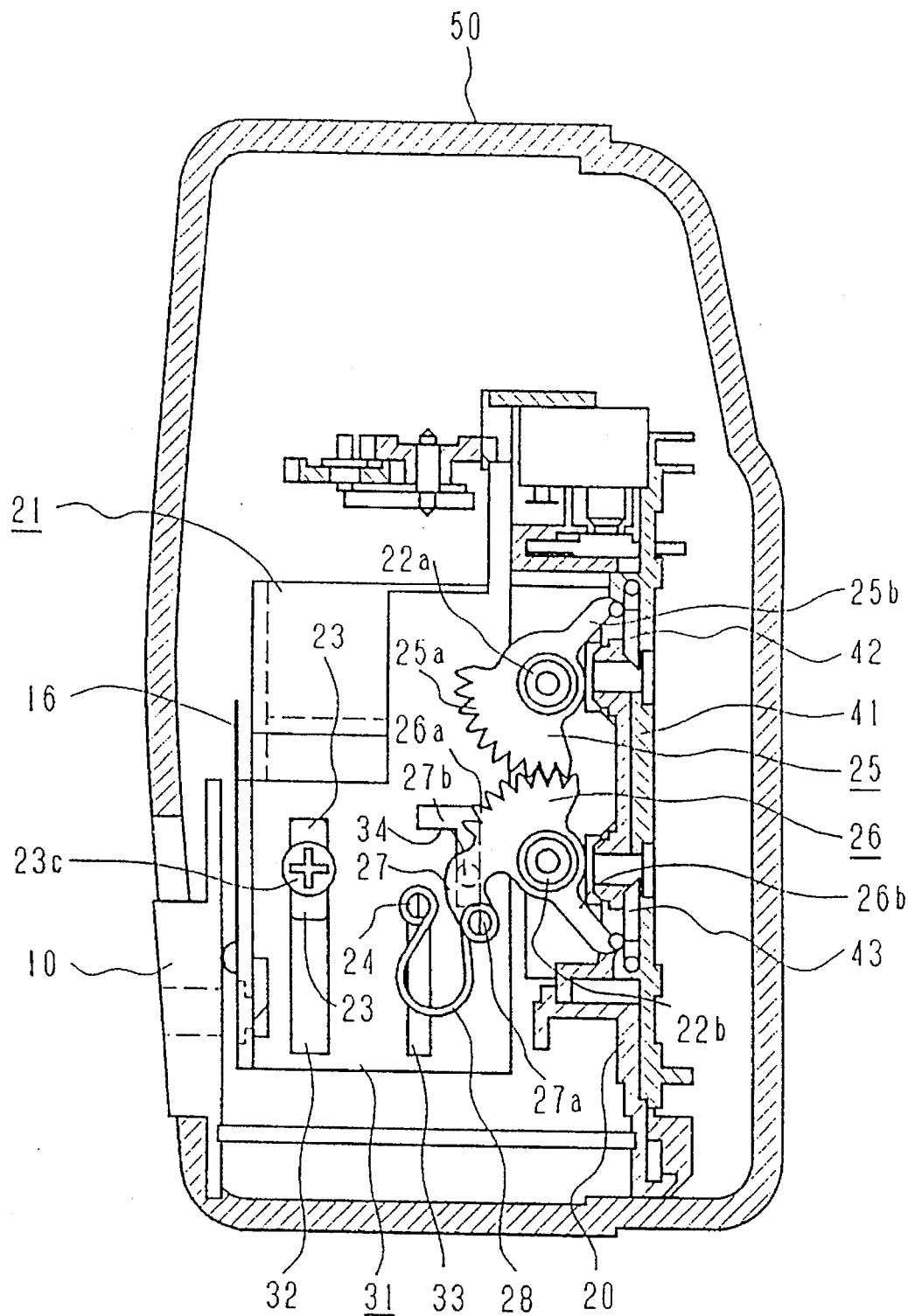
FIG. 2 is a sectional view as taken along a line A—A in FIG. 1, illustrating a manner in which the switching mechanism is operatively associated with a photographing mode changeover mechanism.
Figure 3:
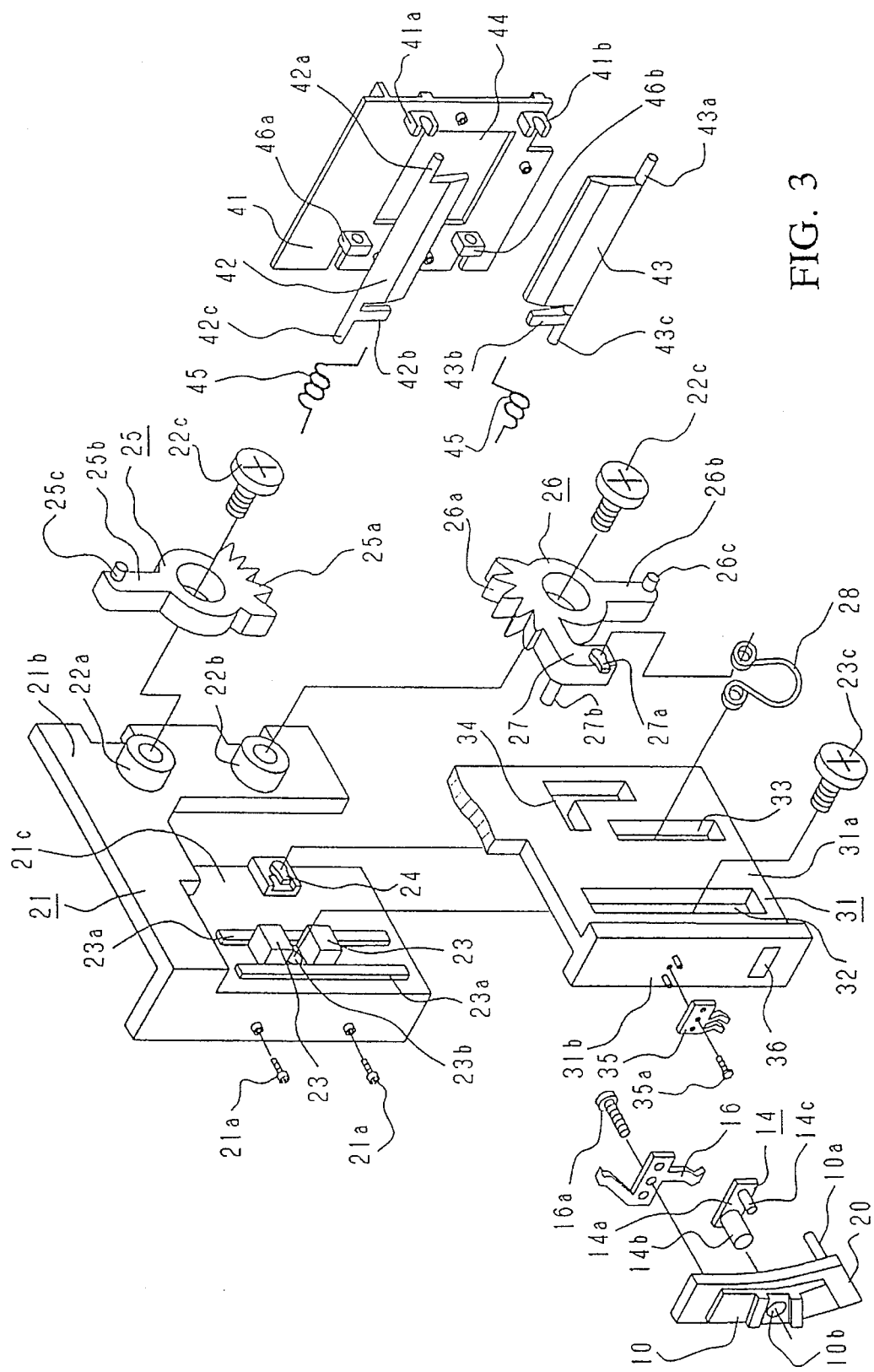
FIG. 3 is an exploded perspective view schematically illustrating a construction of the photographing mode changeover mechanism.

FIG. 2 is a sectional view of the camera as taken along a line A—A in FIG. 1, illustrating details of the photographing mode-switching mechanism. FIG. 3 is an exploded perspective view schematically showing important parts of said switching mechanism. Within a camera housing 50, a panoramic base plate 21 is fixed by setscrews 21a to a camera body 20. The panoramic base plate includes a plate member bent to present a substantially L-shaped cross section, one arm of said L being bent again in an L shape on the way from its upper end to form a difference in level. An upper step surface 21b defined by such difference in level carries thereon a pair of support shafts 22a, 22b vertically spaced from each other by an appropriate distance and a lower step surface 21c also defined by said difference in level carries thereon a pair of vertically extending rails 23a and a pair of guide blocks 23 vertically spaced from each other between these rails 23a. Between guide blocks 23, the lower step surface is formed with a threaded hole 23b. Laterally of rails 23a, the lower step surface 21c is provided with anchoring means 24 on one end of a drive spring, as will be described later, is anchored.

A panoramic slide plate 31 is slidably supported on panoramic base plate 21. The panoramic slide plate 31 presents a substantially T-shaped cross section and a planar portion of the panoramic slide plate 31 defining a leg 31a of said T shape is formed adjacent atop 31b of said T shape with a longitudinal guide hole 32, of which longer sides vertically extends, adjacent and in parallel to guide hole 32 with an insertion hole 33 and adjacent to this insertion hole 33 with a substantially L-shaped limiting hole 34. The guide hole 32 of panoramic slide plate 31 is engaged on the guide blocks 23 of said panoramic base plate 21 so that panoramic slide plate 31 may be slidably supported on the panoramic base plate 21. The panoramic slide plate 31 is provided on a front surface of the substantially T-shaped top 31b with a main switch contact 35 fixed thereto by setscrews 35a. The top 31b is formed in its lower portion with a rectangular drive hole 36 having longer sides extending in a substantially horizontal direction.

Figure 4:
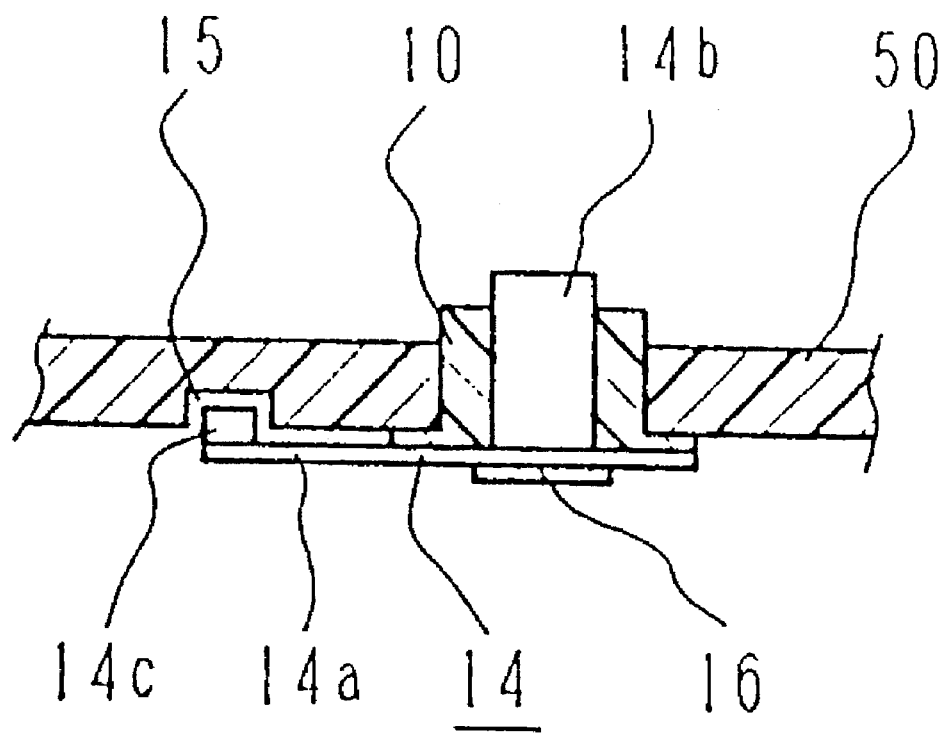
FIG. 4 is a sectional view as taken along a plane orthogonal to a direction in which a changeover knob in movable, schematically illustrating a construction of this changeover knob serving as manipulator means.

A keying pin 10a planted on the rear side of changeover knob 10 extends through a through-hole (not shown) of the camera housing 50 formed along the circular arc to guide the slidable movement of changeover knob 10 into drive hole 36. The changeover knob 10 is centrally provided with a through-hole 10b into which a lock pin 14b of a lock member 14 is inserted, as shown in FIGS. 3 and 4. The lock member 14 comprises a base plate 14a, lock pin 14b planted on one end, and a stopper pin 14c planted on the other end of base plate 14a. The stopper pin 14c is loosely inserted into a limiting groove 15 formed in the inner surface of camera housing 50 and limiting groove 15 is formed in a range allowing the changeover knob 10 to be slidably moved between the OFF index 11 and the ON (or NORMAL MODE) index 12 for the main switch. Accordingly, the changeover knob 10 cannot be moved to the PANORAMA MODE index 13 so long as the stopper pin 14c lies in this limiting groove 15. Lock member 14 is normally biased under a restoring force of a pressure spring 16 including a leaf spring secured by a setscrew 16a on the inner surface of the camera housing 50 so that stopper pin 14c cannot be easily disengaged from limiting groove 15. It should be understood that lock pin 14b will have its forward end projecting above the top surface of the changeover knob 10, as seen in FIG. 4, as lock pin 14b is inserted into the through-hole 10b of the changeover knob 10.

On support shafts 22a, 22b of panoramic base plate 21, there are provided an upper douser driving plate 25 and a lower douser driving plate 26 which are rotatable therearound, respectively, but prevented by respective setscrews 22c from slipping off these support shafts 22a, 22b. These douser driving plates 25, 26 are formed with sector wheel 25a, 26a, respectively, adapted to be engaged with each other. The upper douser driving plate 25 has an upper driving arm 25b extending upwardly, i.e., in the direction opposite to sector gear 25a with the rotational axis of the upper rouser driving plate 25 therebetween and an upper driving pin 25c is planted on an upper end of this upper driving arm 25b so as to extend in parallel to the rotational axis of the upper douser driving plate 25.

Similarly, the lower douser driving plate 26 has a lower driving arm 26b extending downwardly, i.e., in the direction opposite to sector wheel 26a with the rotational axis of the lower douser driving plate 26 therebetween and a lower driving pin 26c is planted on a lower end of this lower driving arm 26b so as to extend in parallel to the rotational axis of the upper douser driving plate 26. A lateral end of the sector wheel 26a extends substantially along an extension of the circular arc which defines this sector wheel 26a to form an input arm 27 which carries an anchor 27a used to anchor one end of a driving spring 28. An input pin 27b is planted on the input pin 27b at its middle point so as to extend toward the panoramic base plate 21.

Guide blocks 23 and anchor 24 of panoramic base plate 21 fixed to the camera body 20 are inserted into the guide hole 32 and the insertion hole 33 of the panoramic slide plate 31 as the panoramic slide plate 31 is put on the panoramic base plate 21. In this state, the driving spring 28, composed of a toggle spring, is suspended between the anchor 24 on the panoramic base plate 21 and the anchor 27a on the lower douser driving plate 26. In the same state, the head of setscrew 23c threaded into said threaded hole 23b, as seen in FIG. 2, prevents the panoramic slide plate 31 from slipping off the panoramic base plate 21.

In the rear portion of the camera 20, there is stationarily provided an aperture frame 41 in front of which an upper douser 42 and a lower douser 43 are supported rotatably around the respective axis extending horizontally and being orthogonal to the optical axis. These dousers 42, 43 are formed at respective one ends with shafts 42a, 43a adapted to be held by fork-like means 41a, 41b formed on the front surface of the aperture frame 41, respectively, and at the respective other ends with input wings 42b, 43b as well as with shafts 42c, 43c extending outwardly from the respective input wings 42c, 43c adapted to be held by beating plates 46a, 46b formed on the aperture frame 41, respectively. An aperture 44 defined by the aperture frame 41 has its upper end lower zones covered or uncovered by the respective douser 42, 43 as dousers 42, 43 are pivotally moved. Specifically, the aperture 44 provides a frame which is longer from side-to-side when the aperture 44 has its upper and lower zone covered by the dousers 42, 43 and, thus, a film frame defined just behind the aperture 44 at this time is not exposed over its upper and lower zones corresponding to those of the aperture 44 covered by the upper and lower dousers 42, 43. Such a state enables a panoramic picture to be taken. With the dousers 42, 43 having been pivotally moved away from said upper and lower zones of the aperture 44, the latter is completely left open and correspondingly the film frame can be exposed over its entire area for a normal-sized picture. It should be understood that the shafts 42c, 43c of the respective dousers 42, 43 are biased with return springs 45, each comprising a torsion coil spring so that the dousers 42, 43 are biased under the restoring force of these return springs 45 to be pivotally moved from their panoramic positions back to their normal positions, respectively.

With the panoramic base plate 21, the panoramic slide plate 31, the aperture frame 41, and the dousers 42, 43 having been assembled together with the camera body 20 into the camera housing 50, the driving pins 25c, 26c planted on the driving arms 25b, 26b of the respective douser driving plates 25, 26 which are, in turn, pivotally supported by the panoramic base plate 21 bear against the input wings 42b, 43b of the respective dousers 42, 43. In this state, the changeover knob 10 is exposed on the front side of the camera.

Now the operation of the switching mechanism according to the invention in a camera having a panoramic photographing function will be described.

To make the camera ready for photographing, changeover knob 10 provided on the front side of the camera is slidably moved from its position of main switch OFF-index 11 to its position of NORMAL MODE index 12. Behind the changeover knob 10, the lock member 14 is biased by the pressure spring so that stopper pin 14c of lock member 14 is loosely inserted into the limiting groove 15 formed in the inner side of the camera housing 50. Limiting groove 15 allows stopper pin 14c to be slidably moved only between the positions of OFF index and NORMAL MODE index 12 of the changeover knob 10. Thus, there is no possibility that stopper pin 14c might be unintentionally moved beyond the position of NORMAL MODE index 12 to the position of PANORAMA MODE index 13 unless lock pin 14, projecting from the changeover knob 10, is operated to move changeover knob 10 towards the position of NORMAL MODE index 12. When changeover knob 10 has been moved to the position of NORMAL MODE index 12, the main switch contact 35 is turned ON, and thereby the camera is made ready for photographing.

To switch the photographing mode from NORMAL MODE to PANORAMA MODE, the changeover knob 10 is moved from the position of NORMAL MODE index 12 to the position of PANORAMA MODE index 13 with lock pin 14b being depressed. Depression of the lock pin 14b allows the base plate 14a of lock member 14 to be disengaged from the rear side of the camera housing 50 against a restoring force of the pressure spring 16 and, thereby, allows stopper pin 14c to leave limiting groove 15. As a result, changeover knob 10 can be moved to the position of PANORAMA MODE index 13 and stopper pin 14c will rub the rear side of the camera housing during this movement of the changeover knob 10.

Once changeover knob 10 has reached the position of PANORAMA MODE index 13, panoramic slide plate 31 is pushed upwards with respect to panoramic base plate 21 because keying pin 10a has been inserted into driving hole 36 of panoramic slide plate 31. At the same time, input pin 27b is pushed by the upper end of the limiting hole 34 because input pin 27b of the lower douser driving plate 26 has been inserted into limiting hole 34 of panoramic slide plate 31. Thus, the lower rouser driving plate 26 will be pivotally moved around support shaft 22b counterclockwise as viewed in FIG. 3. Having reached an appropriate position, the lower douser driving plate 26 can be more smoothly rotated under a restoring force generated by the toggle function of driving spring 28.

Upper douser driving plate 25 is pivotally moved around support shaft 22b clockwise as viewed in FIG. 3 as lower douser driving plate 26 is pivotally moved, because sector wheel 25a of upper douser driving plate 25 is in engagement with sector wheel 26a of lower douser driving plate 26. Driving pins 25c, 26c planted on driving arms 25b, 26b of douser driving plates 25, 26 bear against input wings 42b, 43b of the respective dousers 42, 43 and thereby push dousers 42, 43, respectively. Consequently, upper douser 42 is pivotally moved counterclockwise against the restoring force of return spring 45 to the upper zone of the aperture 44 and lower douser 43 is pivotally moved clockwise to the lower zone of aperture 44, as viewed in FIG. 3. In this way, the upper and lower zones of the aperture 44 are covered by the respective dousers 42, 43 and the film frame is exposed, except for the upper and lower zones, to provide a panoramic-sized picture.

Should the dousers 42, 43 be forcibly moved from their PANORAMA MODE positions back to their NORMAL MODE positions when the camera is accidentally shocked or its rear cover is carelessly opened thereby pushing dousers 42, 43 directly inward, none of the apparatus' for driving the respective dousers 42, 43 will be subjected to a force sufficiently high to damage any component of these driving means because stopper pin 14c of the changeover knob 10 rubs the rear side of the camera housing 50 as changeover knob 10 is pushed upwards in operative association with the panoramic slide plate 31, which is pushed upwards by the lower douser driving plate 26, which is pivotally moved clockwise, as viewed in FIG. 3, due to said forcible movement of the respective dousers 42, 43.

To switch the photographing mode from PANORAMA to NORMAL, changeover knob 10 is moved from the position of PANORAMA MODE index 13 to the position of NORMAL MODE index 12. Such movement of changeover knob 10 causes panoramic slide plate 31 to be pushed upwards, thereby the effect of limiting hole 34 on the input pin 27b is removed and the lower douser driving plate 26 is free to move. Consequently, lower douser 43 is made free from the effect of lower douser driving plate 26 and lower douser 43 is pivotally moved counterclockwise, as viewed in FIG. 3, under a restoring force of return spring 45. Such pivotal movement of lower douser 43 causes lower douser driving plate 26 to be rotated around support shaft 22b clockwise, as viewed in FIG. 3. Engagement of sector wheel 25a with sector wheel 26a causes upper douser driving plate 25 to be rotated around support shaft 22a counterclockwise, as viewed in FIG. 3. This rotation of upper douser driving plate 25 makes upper douser 42 free and, in consequence, upper douser 42 is rotated clockwise, as viewed in FIG. 3, under the restoring force of the return spring 45. In this manner, dousers 42, 43 are retracted from the upper and lower zones of the aperture 44, allowing the film frame to be exposed in normal size over the entire aperture 44.

Having reached an appropriate position, lower douser driving plate 26 is biased to be pivotally moved clockwise under a restoring force owing to the toggle function of driving spring 28. When changeover knob 10 is slidably moved to the position of NORMAL MODE index 12, stopper pin 14c of lock member 14 is inserted by a restoring force of pressure spring 16 into limiting groove 15, so that changeover knob 10 cannot be moved to the position of PANORAMA MODE index 13 unless lock pin 14b is depressed.

Changeover knob 10 may be moved to the position of the main switch OFF index 11 to turn the main switch contact 35 off and, thereby, the camera is made unready for photographing.

While the switching mechanism according to the invention has been described hereinabove as incorporated in a camera having a panoramic photographing function specifically so arranged that the upper and lower zones of the aperture 44 may be covered by dousers 42, 43 to take a panorama-sized picture, it should be understood that the switching mechanism of the invention is applicable also to a camera adopting a mechanism to put a PANORAMA mark on a part of the film frame indicating that the picture is a panoramic one. With a camera of such a type that a PANORAMA mark is put on the film frame and a panoramic picture is made in the process of printing, changeover switch 10 is not required to actuate the douser driving mechanism but is used only to energize a light-emitting diode or the like to put the PANORAMA mark on the film frame. Thus, the changeover switch may be structurally simplified so as to perform a single function of contact changeover.

As will be appreciated from the foregoing description, the switching mechanism of the invention used for a camera having a panoramic photographing function allows the number of parts required from the desired switching function to be reduced, because changeover between ON and OFF of the main switch as well as changeover between NORMAL MODE and PANORAMA MODE can be achieved by a single manipulator means. In addition, the space which otherwise would be required for various components, such as a switching button and a switching knob, can be advantageously reduced because OFF/ON of the main switch as well as photographing modes can be changed over by the single manipulator means provided at one and the same location.

Furthermore, the switching mechanism of the invention contributes to avoiding a malfunction of the camera and to improving maneuverability of the camera having the panoramic photographing function, because changeover of the photographing modes can be achieved only after the main switch has been turned ON, i.e., changeover of the photographing modes must be performed immediately before an actual photographing operation.

The embodiments of the invention in which an exclusive property or privilege is claimed are defined as follows:

1. A switching mechanism for a photographic camera having a panoramic photographing function, the photographing mode of said camera selectively switched between a NORMAL MODE which provides a normal-sized picture and a PANORAMIC MODE which provides a picture of laterally long size corresponding to the normal frame size and having upper and lower zones thereof cut off, comprising:

a manipulator;

an ON/OFF changeover for a main switch serving to change over the camera between its operative and non-operative states and a mode changeover between the NORMAL and PANORAMA MODES, wherein said ON/OFF changeover and said mode changeover are simultaneously performed by movement of said manipulator; and wherein the photographing mode is automatically set to one of the NORMAL and PANORAMA MODES as the main switch is turned ON, and wherein said manipulator includes a lock means and the photographing mode that is automatically set by turning said main switch ON can be changed over to the other photographing mode only after said lock means has been released.

2. The switching mechanism for a photographing camera having a panoramic photographing function according to claim 1, wherein the photographing mode is automatically set to NORMAL MODE as the main switch is turned ON.

3. The switching mechanism for a photographing camera having a panoramic photographing function according to claim 1, wherein changeover between ON/OFF of the main switch as well as changeover of the photographing mode are simultaneously performed by slidable movement of said manipulator.

4. The switching mechanism for a photographing camera having a panoramic photographing function according to claim 3, wherein changeover between ON/OFF of the main switch as well as changeover of the photographing mode are simultaneously performed by slidably moving said manipulator along a circular arc.

5. The switching mechanism for a photographic camera having a panoramic photographing function according to claim 3, wherein changeover between ON/OFF of the main switch as well as changeover of the photographing mode are simultaneously performed by slidably moving said manipulator along a straight line.

6. The switching mechanism for a photographing camera having a panoramic photographing function according to claim 2, wherein changeover between ON/OFF of the main switch as well as changeover of the photographing mode are simultaneously performed by slidable movement of said manipulator.

7. The switching mechanism for a photographing camera having a panoramic photographing function according to claim 6, wherein changeover between ON/OFF of the main switch as well as changeover of the photographing mode are simultaneously performed by slidably moving said manipulator along a circular arc.

8. The switching mechanism for a photographic camera having a panoramic photographing function according to claim 6, wherein changeover between ON/OFF of the main switch as well as changeover of the photographing mode are simultaneously performed by slidably moving said manipulator along a straight line.

9. A switching mechanism for a photographic camera having a panoramic photographing function, said camera including a pair of dousers provided in front of an aperture and supported so as to be pivotally moved about respective horizontal axes between positions covering upper and lower zones of the aperture and positions leaving the aperture fully open, and having its photographing mode selectively changed over between a NORMAL MODE which provides a picture of laterally long size corresponding to the normal size having upper and lower zones thereof cut off, comprising:

a manipulator;

an ON/OFF changeover for a main switch serving to change over the camera between its operative and non-operative states and a mode changeover between the NORMAL and PANORAMA MODES, wherein said ON/OFF changeover and said mode changeover are simultaneously performed by movement of said manipulator means;

wherein the photographing mode is automatically set to one of the NORMAL and PANORAMA MODES as the main switch is turned ON; and wherein said dousers are pivotally moved in operative association with operation of the photographing mode changeover, and wherein said manipulator includes a lock means and the photographing mode that is automatically set by turning said main switch ON can be changed over to the other photographing mode only after said lock means has been released.

10. The switching mechanism for a photographic camera having a panoramic photographing function according to claim 9, wherein the dousers are allowed to be pivotally moved to their positions of said NORMAL MODE as an external force is exerted on said dousers occupying their positions of said PANORAMA MODE.

11. The switching mechanism for a photographic camera having a panoramic photographing function according to claim 10, wherein the photographing mode is automatically set to said NORMAL MODE as the main switch is turned ON.

12. The switching mechanism for a photographing camera having a panoramic photographing function according to claim 9, wherein the photographing mode is automatically set to NORMAL MODE as the main switch is turned ON.

13. The switching mechanism for a photographing camera having a panoramic photographing function according to claim 9, wherein changeover between ON/OFF of the main switch as well as changeover of the photographing mode are simultaneously performed by slidable movement of said manipulator.

14. The switching mechanism for a photographing camera having a panoramic photographing function according to claim 13, wherein changeover between ON/OFF of the main switch as well as changeover of the photographing mode are simultaneously performed by slidably moving said manipulator along a circular arc.

15. The switching mechanism for a photographic camera having a panoramic photographing function according to claim 13, wherein changeover between ON/OFF of the main switch as well as changeover of the photographing mode are simultaneously performed by slidably moving said manipulator along a straight line.

16. A switching mechanism for a photographic camera having a panoramic photographing function, said camera being adapted to mark mode information on an individual frame of film indicating for printing operation whether that frame of film has been exposed in a NORMAL MODE which provides a normal-sized picture or in a PANORAMA MODE which provides a picture of laterally long size corresponding to the normal size having upper and lower zones thereof cut off, comprising:

a manipulator;

an ON/OFF changeover for a main switch serving to change over the camera between its operative and non-operative states and a mode changeover between the NORMAL and PANORAMA MODES, wherein said ON/OFF changeover and said mode changeover are simultaneously performed by movement of said manipulator; and wherein the photographing mode is automatically set to one of the NORMAL and PANORAMA MODES as the main switch is turned ON, and wherein said manipulator includes a lock means and the photographing mode that is automatically set by turning said main switch ON can be changed over to the other photographing mode only after said lock means has been released.

17. The switching mechanism for a photographing camera having a panoramic photographing function according to claim 16, wherein the photographing mode is automatically set to NORMAL MODE as the main switch is turned ON.

18. The switching mechanism for a photographing camera having a panoramic photographing function according to claim 16, wherein changeover between ON/OFF of the main switch as well as changeover of the photographing mode are simultaneously performed by slidably movement of said manipulator.

19. The switching mechanism for a photographing camera having a panoramic photographing function according to claim 18, wherein changeover between ON/OFF of the main switch as well as changeover of the photographing mode are simultaneously performed by slidably moving said manipulator along a circular arc.

20. The switching mechanism for a photographic camera having a panoramic photographing function according to claim 18, wherein changeover between ON/OFF of the main switch as well as changeover of the photographing mode are simultaneously performed by slidable moving said manipulator along a straight line.

21. A switching mechanism for a photographic camera that may be selectively switched to operate in one of a panoramic and normal mode, said switching mechanism comprising:

a switch movable between a first position indicating an OFF state in which the camera is disabled, a second position indicating an ON/NORMAL MODE in which the camera is enabled and operable in a normal mode, and a third position indicating an ON/PANORAMIC MODE in which the camera is enabled and operable in a panoramic mode;

means for turning the camera OFF when said switch is in said first position and for turning the camera ON when said switch is in said second or third position;

means for adjusting an aperture size of the camera to a normal size when said switch is in said second position and to a different size corresponding to a panoramic picture when said switch is in said third position; and locking means for preventing said switch from moving from said second position to said third position unless said locking means is actuated by a user.

22. The switching mechanism for a photographing camera having a panoramic photographing function according to claim 21, wherein the photographing mode is automatically set to NORMAL MODE as said switch is turned ON.

23. The switching mechanism for a photographing camera having a panoramic photographing function according to claim 21, wherein changeover between ON/OFF of said switch as well as changeover of the photographing mode are simultaneously performed by slidable movement of said switch.

24. The switching mechanism for a photographing camera having a panoramic photographing function according to claim 23, wherein changeover between ON/OFF of said switch as well as changeover of the photographing mode are simultaneously performed by slidably moving said switch along a circular arc.

25. The switching mechanism for a photographic camera having a panoramic photographing function according to claim 23, wherein changeover between ON/OFF of said switch as well as changeover of the photographing mode are simultaneously performed by slidably moving said switch along a straight line.

\* \* \* \* \*